(12) United States Patent
Loacker

(10) Patent No.: US 11,110,786 B2
(45) Date of Patent: Sep. 7, 2021

(54) ELECTRIC TRUCK AND BATTERY PACK

(71) Applicant: DESIGNWERK PRODUCTS AG, Winterthur (CH)

(72) Inventor: Frank Loacker, Pfungen (CH)

(73) Assignee: DESIGNWERK PRODUCTS AG, Winterthur (CH)

( * ) Notice: Subject to any disclaimer, the term of this patent is extended or adjusted under 35 U.S.C. 154(b) by 68 days.

(21) Appl. No.: 16/586,399

(22) Filed: Sep. 27, 2019

(65) Prior Publication Data
US 2021/0094400 A1     Apr. 1, 2021

(51) Int. Cl.
*B60K 1/04* (2019.01)
*H01M 50/20* (2021.01)

(52) U.S. Cl.
CPC ............. *B60K 1/04* (2013.01); *H01M 50/20* (2021.01); *B60K 2001/0405* (2013.01); *B60K 2001/0455* (2013.01)

(58) Field of Classification Search
CPC .................................. B60K 1/04; H01M 50/20
See application file for complete search history.

(56) References Cited

U.S. PATENT DOCUMENTS

| | | | |
|---|---|---|---|
| 2,094,329 A | 9/1937 | Mascuch | |
| 3,708,028 A | 1/1973 | Hafer | |
| 10,421,345 B2 * | 9/2019 | Kerspe | B60L 3/0015 |
| 2008/0318119 A1 | 12/2008 | Watanabe et al. | |
| 2009/0000843 A1 | 1/2009 | Burchett et al. | |
| 2010/0163322 A1 * | 7/2010 | Stefani | B60L 50/66 180/65.21 |
| 2018/0319263 A1 | 11/2018 | Hegewald et al. | |

FOREIGN PATENT DOCUMENTS

| | | |
|---|---|---|
| CN | 107284211 A | 10/2017 |
| CN | 207368041 U | 5/2018 |
| CN | 208439312 U | 1/2019 |
| CN | 109677253 A | 4/2019 |
| CN | 208812975 U | 5/2019 |

(Continued)

OTHER PUBLICATIONS

Co-pending U.S. Appl. No. 16/543,100, Loacker et al., "Power Supply," filed Aug. 16, 2019.

(Continued)

*Primary Examiner* — John D Walters
*Assistant Examiner* — James J Triggs
(74) *Attorney, Agent, or Firm* — Pauley Erickson & Swanson

(57) ABSTRACT

An electric truck includes a battery pack assembly with a battery pack mounting structure and at least one battery pack. The battery pack includes a box shaped outer housing and a battery unit arranged inside and supported by the outer housing. The battery pack mounting structure for each battery pack includes a first and a second cantilever attached to a chassis of the electric truck, the first and second cantilever extending in transversal direction and being in the longitudinal direction spaced a distance apart from each other. Further, the battery pack is interconnected to the first and the second cantilever during operation in a floating manner allowing a torsional movement of the chassis around the longitudinal direction.

13 Claims, 4 Drawing Sheets

(56) References Cited

FOREIGN PATENT DOCUMENTS

| | | |
|---|---|---|
| CN | 208881608 U | 5/2019 |
| CN | 109955704 A | 7/2019 |
| DE | 10 2011 109 024 A1 | 1/2013 |
| DE | 10 2017 214 023 A1 | 2/2019 |
| EP | 3 327 821 A1 | 5/2018 |
| GB | 2553537 A | 3/2018 |
| MX | 2019000281 A | 9/2019 |

OTHER PUBLICATIONS

Co-pending U.S. Appl. No. 16/544,222, Loacker, "Battery Pack," filed Aug. 19, 2019.
Co-pending U.S. Appl. No. 16/545,960, Loacker, "Drivetrain," filed Aug. 20, 2019.

\* cited by examiner

ELECTRIC TRUCK AND BATTERY PACK

BACKGROUND OF THE INVENTION

Field of the Invention

The present disclosure relates to an electric truck and a battery pack therefore.

Discussion of Related Art

Electric trucks comprising a battery pack assembly with a battery pack mounting structure are known from the prior art.

CN109955704A first published on Jul. 2, 2019 in the name of Jiangsu University discloses a battery pack suspension device for an electric vehicle, which comprises a chassis, a hydraulic shock absorber, a buffer spring, a battery box, a connecting lug and a battery unit. The battery unit is fixed in the battery unit compartment inside the battery box. The battery box is connected with the connecting lug on the upper side of the chassis through a hydraulic shock absorber, and the bottom of the battery box is provided with a buffer spring through the axis bolt. Further the battery unit is bolted to the battery box body.

CN207368041U first published on May 15, 2018 in the name of Shenzhen Optimumnano Energy Co., Ltd discloses a power battery box bracket including a pair of beams and a plurality of connecting rods respectively vertically disposed on a pair of beams; the pair of beams is spaced apart, and each of the beams is correspondingly provided with two connecting rods on one beam.

SUMMARY OF THE INVENTION

A preferred variation is directed to an electric truck comprising a battery pack assembly comprising a battery pack mounting structure and at least one battery pack. Depending on the field of application and design the electric truck may comprise two or more battery packs. The at least one battery pack usually comprises a box shaped outer housing having a certain length in a longitudinal direction of the truck, a certain width in a transversal direction of the truck and a certain height in a vertical direction of the truck. Preferably the outer housing is cuboid-shaped. If appropriate the outer housing of the battery pack is made from sheet metal in order to form light, rigid and robust outer housing. It is desirable to avoid shear and/or torsional forces resulting from the movement of the chassis of the electric truck during operation and being transferred to the rigid outer housing of the battery pack in order to avoid material fatigue and damage. Usually at least one battery unit is arranged inside and supported by the outer housing. In some variations multiple battery units may be arranged inside the outer housing of the battery pack.

The battery pack mounting structure per battery pack comprises a first and a second cantilever attached to a chassis of the electric truck. Depending on the application three or more cantilevers per battery pack may be attached to the chassis of the electric truck. The first and second cantilever extend in transversal direction being in the longitudinal direction spaced a distance apart from each other. In some variations at least the first and/or the second cantilever may be attached on a lateral side of the chassis. Alternatively, or in addition at least the first and/or the second cantilever may extend in transversal direction over the width of chassis and may be attached to the chassis.

During operation of the electric truck the battery pack is interconnected to the first and the second cantilever in a floating manner allowing at least a certain torsional movement of the chassis around the longitudinal direction. In other words, the battery pack is mechanically decoupled from torsional movements of the chassis of the electric truck which occur during operation of the electric truck. This way shear and/or torsional forces on the rigid outer housing of the battery pack are reduced compared to a rigid connection between the battery pack and the first and respectively the second cantilever.

In a preferred variation the outer housing may be in the mounted position interconnected to the first cantilever and to the second cantilever by mounting means. The mounting means may form a floating fit in the mounted position of the battery pack. If appropriate mounting means are arranged on the leading end region and the trailing end region of the outer housing of the battery pack in the longitudinal direction. Preferably the mounting means may be out of the group of following elements or a combination thereof: groove and pin; centering pin and centering hole; different types bolt connectors and slide connectors. Favorably the mounting means may be configured to restrict a displacement of the battery pack relative to the chassis in the longitudinal direction and the traversal direction, but allow for a certain displacement relative to the chassis in the vertical direction. Good results may be achieved if the mounting means in combination provide at least in vertical direction a three-point suspension for the outer housing with respect to the first and the second cantilever. Preferably the battery pack is in the mounted position arranged between the first and the second cantilever. This allows the battery pack assembly to be of a compact size in the vertical direction.

In a preferred variation the battery pack is insertable into and removable from battery pack mounting structure.

At least the first and/or the second cantilever may comprise at least one guide surface extending in traversal direction configured to guide the battery pack into the mounted position when moved in the traversal direction during insertion. Preferably at least the first and/or the second cantilever comprise two or more guide surfaces oriented towards the battery pack in the mounted position. This may be achieved by a profile/cross-section of the first and/or second cantilever being L-shaped and/or double T-shaped and/or C-shaped. In some variations securing means may be attached to the first and/or second cantilever for securing the battery pack in the mounted position. The securing means may be closable from an open state into a closed state and may be openable from a closed state into an open state. Preferably the securing means are configured to prevent the mounting means battery pack to disengage in the mounted position, when the securing means are in a closed state. Depending on the application the securing means may comprise at least one buffer stopper. Preferably the at least one buffer stopper is made from an elastic material. When the battery pack is inserted into the battery pack mounting structure the securing means is in the open state and when the battery pack is in the mounted position the securing means can be set to the closed state.

Furthermore, the battery pack mounting structure may comprise an alignment device configured to limit a movement of the battery pack in the transversal direction when moved towards the mounted position. Alternatively, or in addition the alignment device may be configured to align the mounting means and to accurately determine the mounting position of the battery pack when the battery pack is moved in the transversal direction towards the mounted position. In some variations the alignment device can be a stopper attached to the chassis and/or the first and/or the second cantilever. Depending on the field of application at least one mounting means is formed by a centering pin and a seat, into which the centering pin engages in the mounted position. The centering pin and its associated seat may form a floating fit.

Vibrations are a known challenge for battery packs resulting in safety requirements regulations like UN ECE Regulation No. 100 (also referred to as R100) which addresses the safety requirements specific to the electric power train of road vehicles including rechargeable battery packs.

The battery pack assembly of the electric truck may further comprise at least one damping element being arranged between the chassis and the battery unit configured to absorb lifetime reducing frequencies. The lifetime reducing frequencies can range from 5 Hz to 100 Hz. Usually the battery pack assembly comprises two or more damping elements. Preferably the at least one damping element comprises at least partially of a porous material and/or an elastic polymer. At least one damping element is arranged between the first and/or second cantilever and the outer housing of the battery pack. It is advantageous if the at least one damping element between the first and/or second cantilever and the outer housing of the battery pack is arranged at least partially between contact areas of at least one of the mounting means. Thereby the at least one damping element may form an intermediate bearing layer between the battery pack and the first and/or second cantilever. Alternatively, or in addition at least one damping element may be arranged inside the battery pack. Preferably the damping element inside the battery pack acts as a support structure for supporting the at least one battery unit with respect to the outer housing of the battery pack. Good results are possible if the support structure substantially surrounds the at least one battery unit. In this variation a dampening of vibrations of different deflection directions is possible.

The disclosure may additionally be described by the following clauses:

Clause 1: An electric truck comprising a battery pack assembly comprising a battery pack mounting structure and at least one battery pack, wherein a. said battery pack comprising a box shaped outer housing having a certain length in a longitudinal direction of the truck, a certain width in a transversal direction of the truck and a certain height in a vertical direction of the truck and a battery unit arranged inside and supported by the outer housing;

b. said battery pack mounting structure per battery pack comprising a first and a second cantilever attached to a chassis of the electric truck, said first and second cantilever extending in transversal direction and being in the longitudinal direction spaced a distance apart from each other; wherein c. the battery pack during operation is interconnected to the first and the second cantilever in a floating manner allowing a torsional movement of the chassis around the longitudinal direction.

Clause 2: The electric truck according to clause 0, wherein the outer housing is in the mounted position interconnected to the first cantilever and to the second cantilever by mounting means.

Clause 3: The electric truck according to clause 0, wherein the mounting means in combination provide at least in vertical direction a three-point suspension for the outer housing with respect to the first and the second cantilever.

Clause 4: The electric truck according to clauses 0 or 0, wherein the mounting means are out of the group of following elements or a combination thereof: groove and pin; centering pin and centering hole; types of bolt connectors; or slide connectors;

Clause 5: The electric truck according to at least one of the preceding clauses, wherein the battery pack in the mounted position is arranged between the first and the second cantilever.

Clause 6: The electric truck according at least one of the preceding clauses 0 to 0, wherein the at least one mounting means is formed by a centering pin and a seat, into which the centering pin engages in the mounted position.

Clause 7: The electric truck according to at least one of the preceding clauses, wherein at least one damping element is arranged between the chassis and the battery unit configured to absorb lifetime reducing frequencies.

Clause 8: The electric truck according to any one of the previous clauses, wherein the at least one damping element comprises at least partially of a porous material and/or an elastic polymer.

Clause 9: The electric truck according to any one of the previous clauses, wherein at least one damping element acts as a support structure for supporting the at least one battery unit with respect to the outer housing of the battery pack.

Clause 10: The electric truck according to clause 9, wherein the support structure substantially surrounds at the least one battery unit.

Clause 11: The electric truck according to any one of the previous clauses, wherein at least one damping element is arranged between the first and/or second cantilever and the outer housing of the battery pack.

Clause 12: The electric truck according to any one of the previous clauses, wherein at least the first and/or the second cantilever comprises at least one guide surface extending in traversal direction configured to guide the battery pack when moved in the traversal direction during insertion into the mounted position.

Clause 13: The electric truck according to any one of the previous clauses, wherein the battery pack mounting structure comprises an alignment device configured to limit a movement of the battery pack in the transversal direction when moved towards the mounted position and to align the mounting means.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

DESCRIPTION OF PREFERRED EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
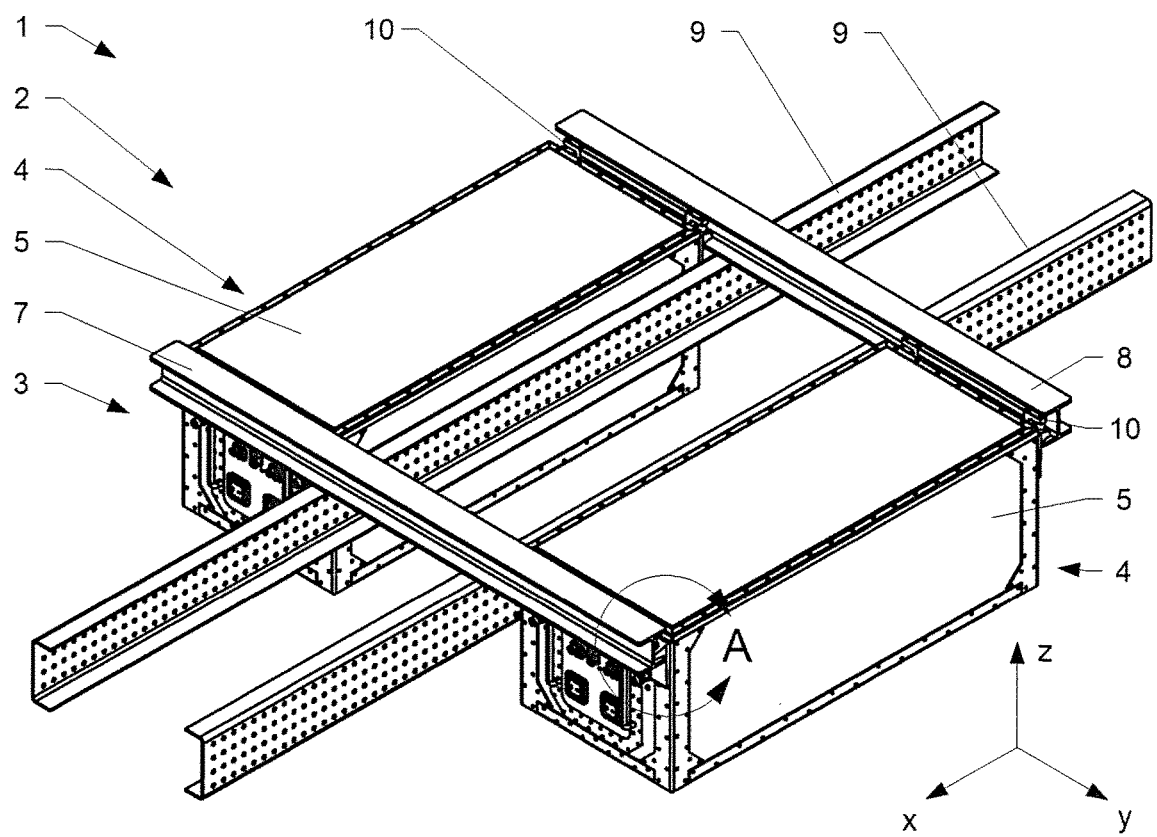
FIG. 1 shows a partial perspective view of an electric truck according to the invention.
Figure 3:
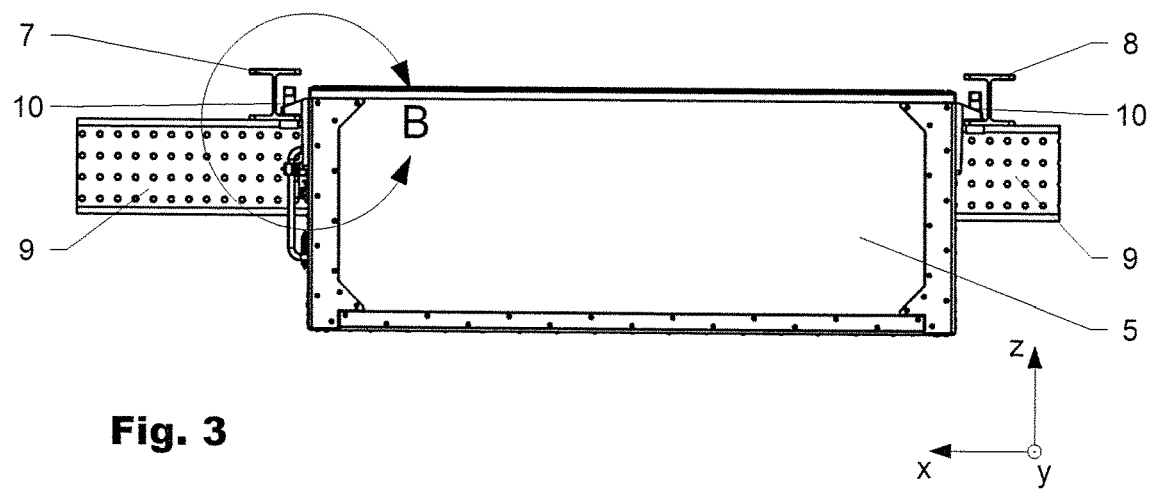
FIG. 3 shows a side view of the electric truck from FIG. 1 in the transversal direction y.
Figure 5:
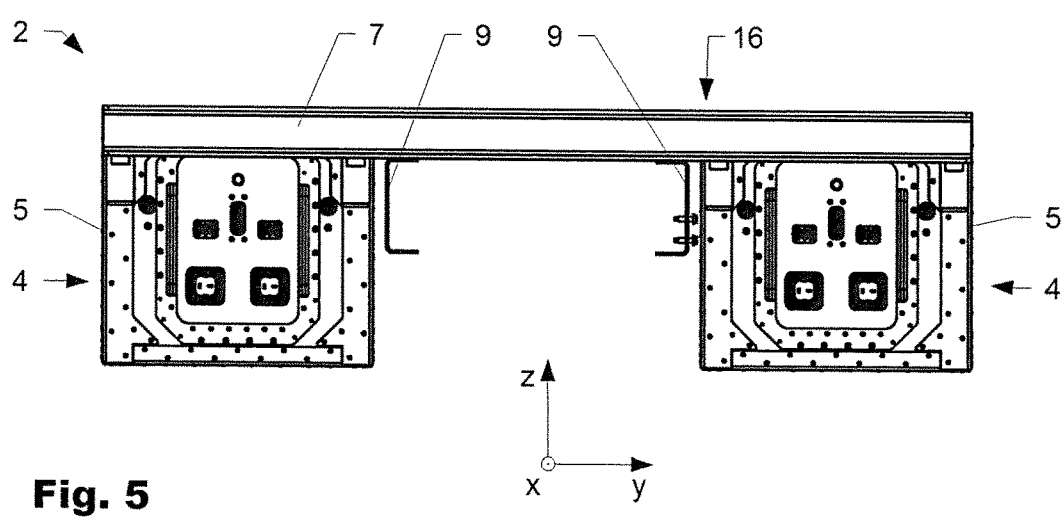
FIG. 5 shows a side view of the electric truck from FIG. 1 in the longitudinal direction x.

FIGS. 1, 3 and 5 show different views of a variation of an electric truck 1 comprising a battery pack assembly 2 comprising a battery pack mounting structure 3 and at least one battery pack 4. In the shown variation the battery pack assembly 2 has two cuboid-shaped battery packs 4. The battery packs 4 each comprise a box shaped outer housing 5 having a certain length in a longitudinal direction x of the truck, a certain width in a transversal direction y of the truck and a certain height in a vertical direction z of the truck. The outer housing 5 of the battery pack 4 is made from sheet metal forming a rigid outer housing 5.

The battery pack mounting structure 3 for each pack comprises a first and a second cantilever 7, 8 attached to a chassis 9 of the electric truck as shown in FIGS. 1, 3 to 5 and 8. The first and second cantilever 7, 8 extend in transversal direction y and being in the longitudinal direction x spaced a distance apart from each other. In the variation shown in FIG. 8 the first and/or the second cantilever 8 is attached on a lateral side of the chassis 9. FIGS. 1, 3 and 5 show a variation wherein at least the first and/or the second cantilever 7, 8 extends in transversal direction y over the chassis 9 and is attached thereto.

FIGS. 1 to 5 and 8 to 9 show the battery packs 4 in a mounted position. During operation of the electric truck 1 i.e. the battery packs 4 are in the mounted position, said battery packs 4 are interconnected to the first and the second cantilever 7, 8 in a floating manner allowing at least a certain torsional movement of the chassis 9 around the longitudinal direction x. This way negative shear and/or torsional forces on the rigid outer housing 5 of the battery pack 5 are reduced.

Figure 2:
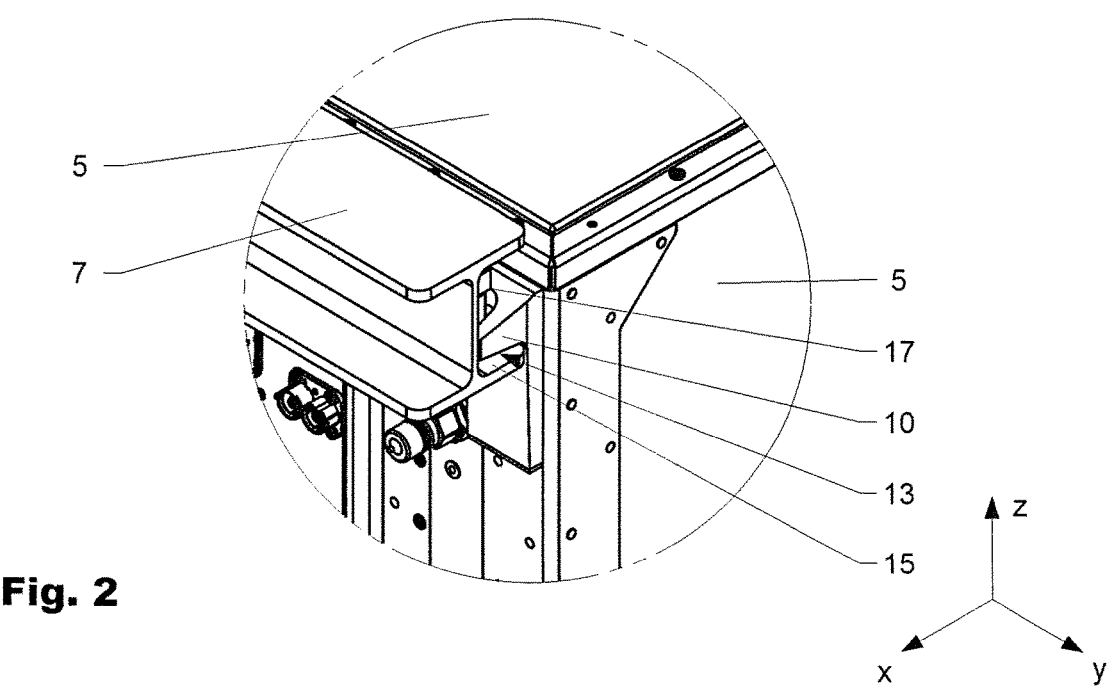
FIG. 2 shows a detailed view of FIG. 1 indicated by circle A.
Figure 4:
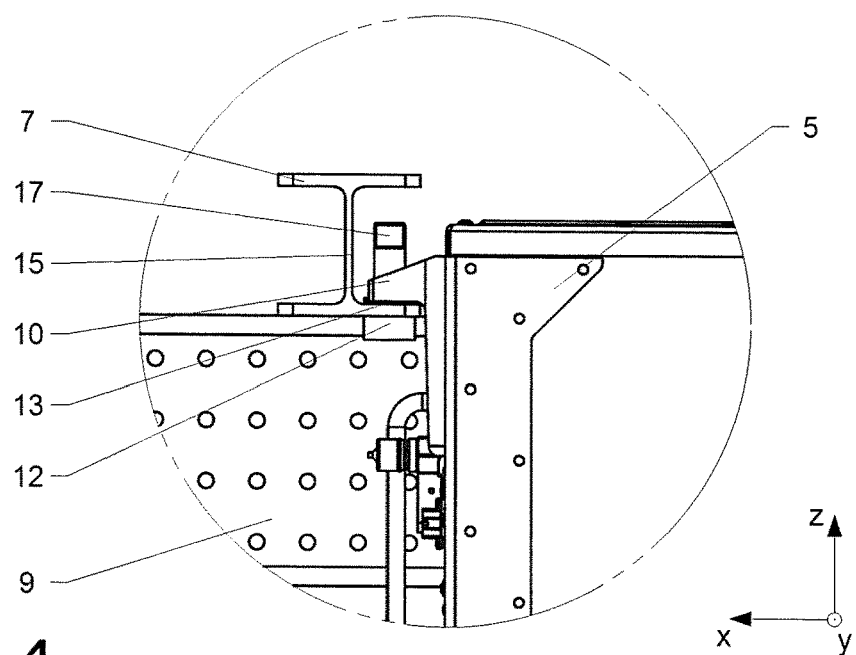
FIG. 4 shows a detailed view of FIG. 3 indicated by circle B.
Figure 9:
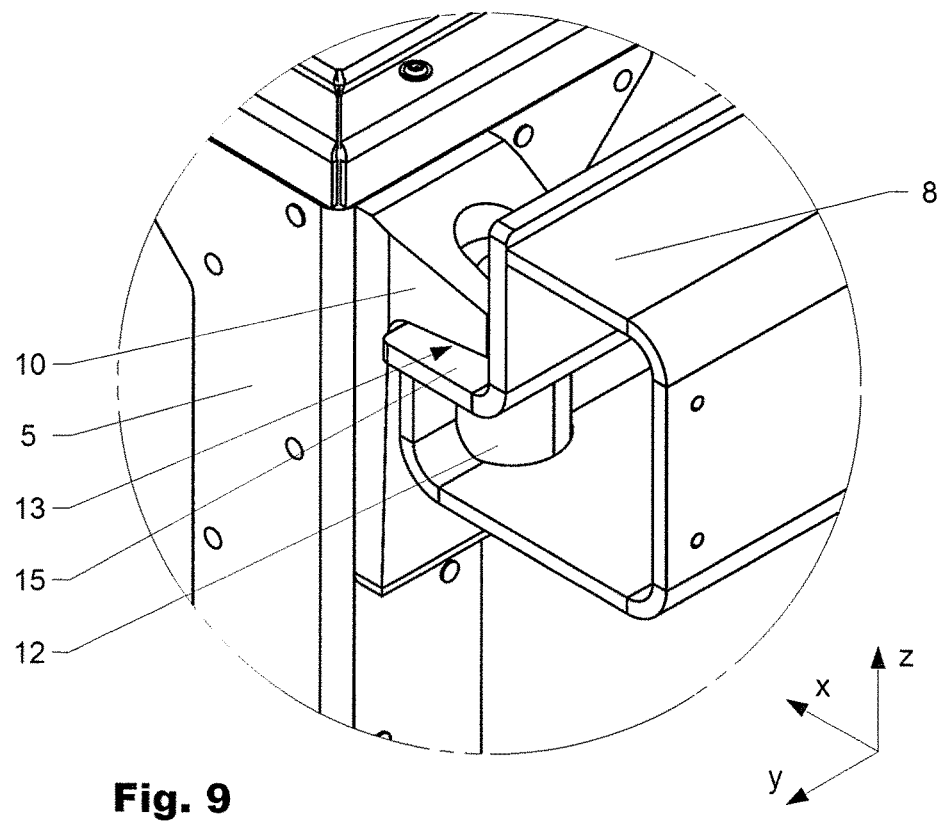
FIG. 9 shows a detailed view of FIG. 8 indicated by circle F.

FIGS. 2, 4 and 9 show a detailed view the outer housing 5 in the mounted position interconnected to the first cantilever and/or to the second cantilever 7, 8 by the mounting means 10. FIG. 4 further shows securing means 17 in a closed state. The mounting means 10 form a floating fit in the mounted position of the battery pack 4. At least one mounting means 10 is formed by a centering pin 11 and a seat 12, into which the centering pin 11 engages in the mounted position as shown in FIGS. 4 and 9. The centering pin 11 and its associated seat 12 form a floating fit. The mounting means 10 are configured to restrict a displacement of the battery pack 4 relative to the chassis 9 in the longitudinal direction x and the traversal direction y, but allow for a certain displacement relative to the chassis 9 in the vertical direction z. The securing means 17 in the shown variation formed as at least one buffer stopper 17 made from rubber. The at least one buffer stopper prevents the centering pin 11 and the seat 12 to disengage. The mounting means 10 in combination provide at least in vertical direction z a three-point suspension for the outer housing 5 with respect to the first and the second cantilever 7, 8. In the variations shown there are four mounting points with associated mounting means 10. When a torsional movement of the chassis 9 occurs it is possible that the weight of the battery pack 4 which is distributed to each mounting point changes, this leads effectively to a temporary three-point suspension, in which the weight of the battery pack 4 is substantially carried through three mounting points. The battery packs 4 are in the mounted position arranged between the first and the second cantilever 7, 8.

FIGS. 4 and 9 show that at least the first and/or the second cantilever 7, 8 comprise at least one guide surface 15 extending in traversal direction y configured to guide the battery pack 4 into the mounted position when moved in the traversal direction y during insertion. In the shown variations the first and/or the second cantilever 7, 8 comprise two guide surfaces 15 oriented towards the battery pack in the mounted position. One guide surface 15 is perpendicular to the longitudinal direction x indicated in FIG. 4 and another guide surface 15 is perpendicular to the vertical direction z shown in FIG. 9. The guide surfaces 15 are located on a profile/cross-section of the first and/or second cantilever 7, 8 being L-shaped (FIGS. 8 and 9) and/or double T-shaped (FIGS. 1 to 5).

Figure 8:
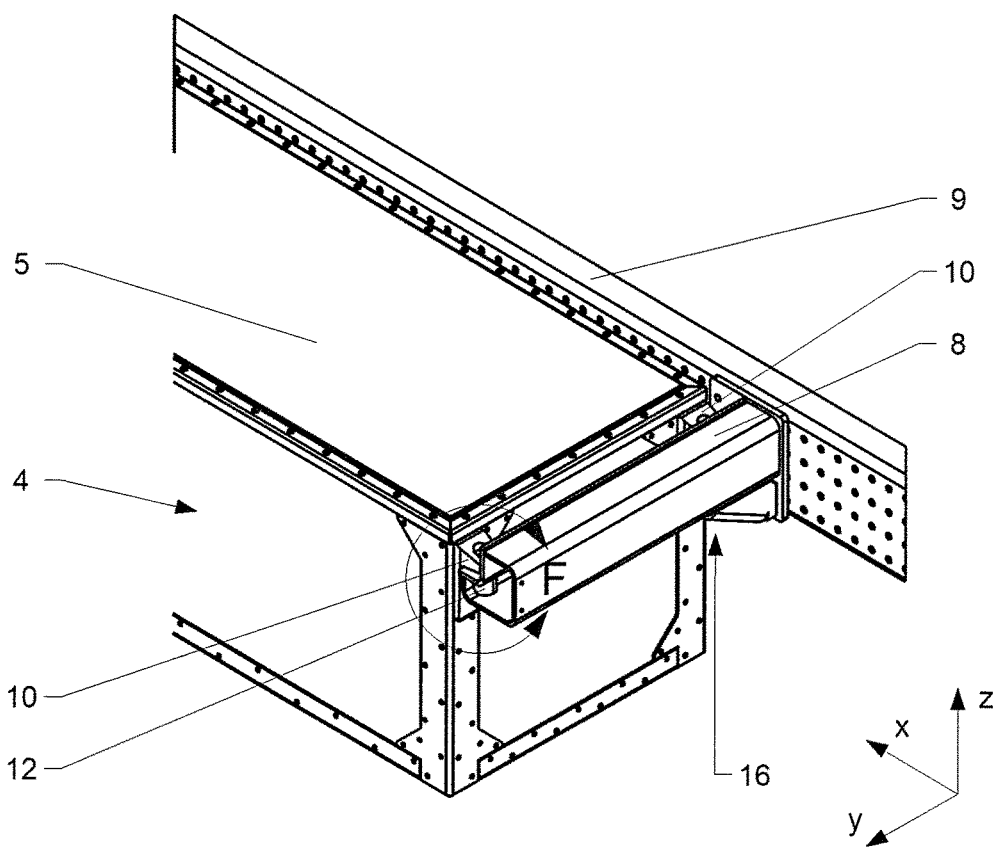
FIG. 8 shows a partial perspective view of a battery pack assembly.

Furthermore, FIGS. 5 and 8 show that the battery pack mounting structure 3 comprises an alignment device 16 configured to limit a movement of the battery pack 4 in the transversal direction y when moved towards the mounted position. In addition, the alignment device 16 is configured to align the mounting means 10 and to accurately determine the mounting position of the battery pack 4 when the battery pack 4 is moved in the transversal direction y towards the mounted position. In the illustrated variation the alignment device 16 is a stopper 16 attached to the chassis 9 and/or the first cantilever 7 and/or the second cantilever 8.

Figure 6:
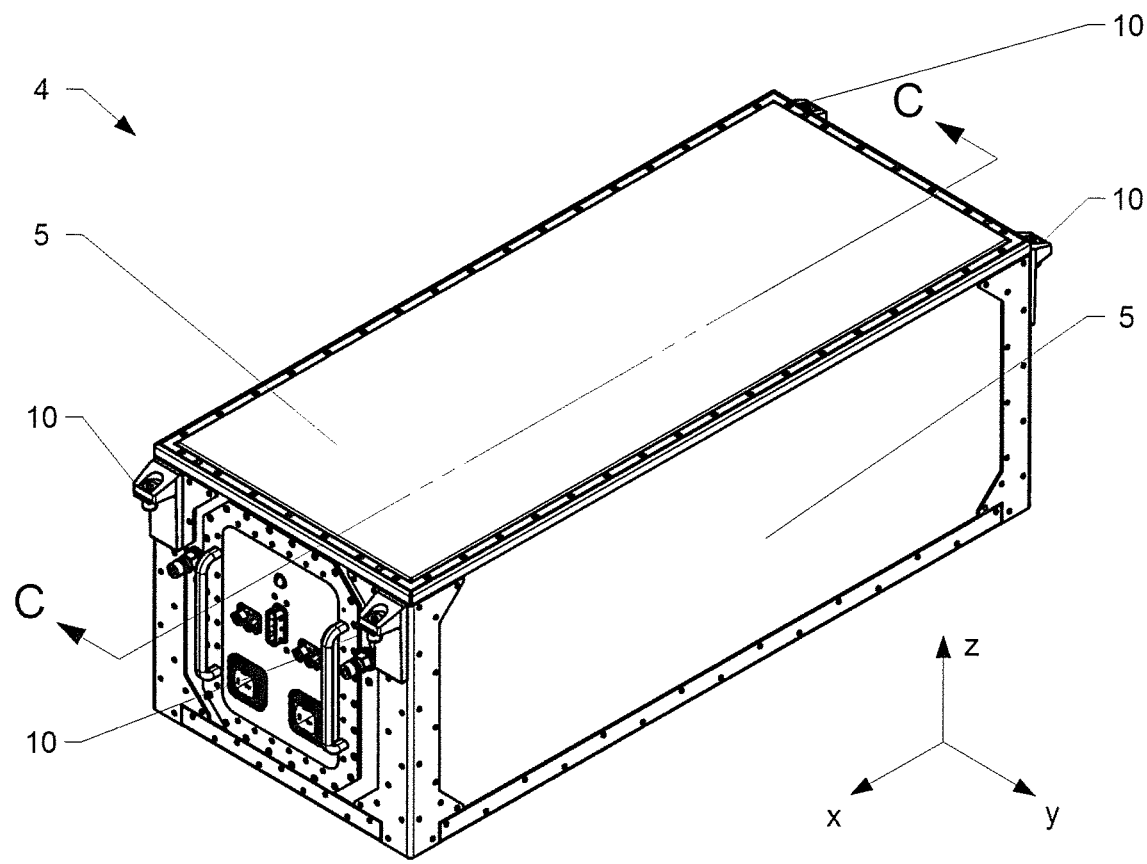
FIG. 6 shows a perspective view of a battery pack.
Figure 7:
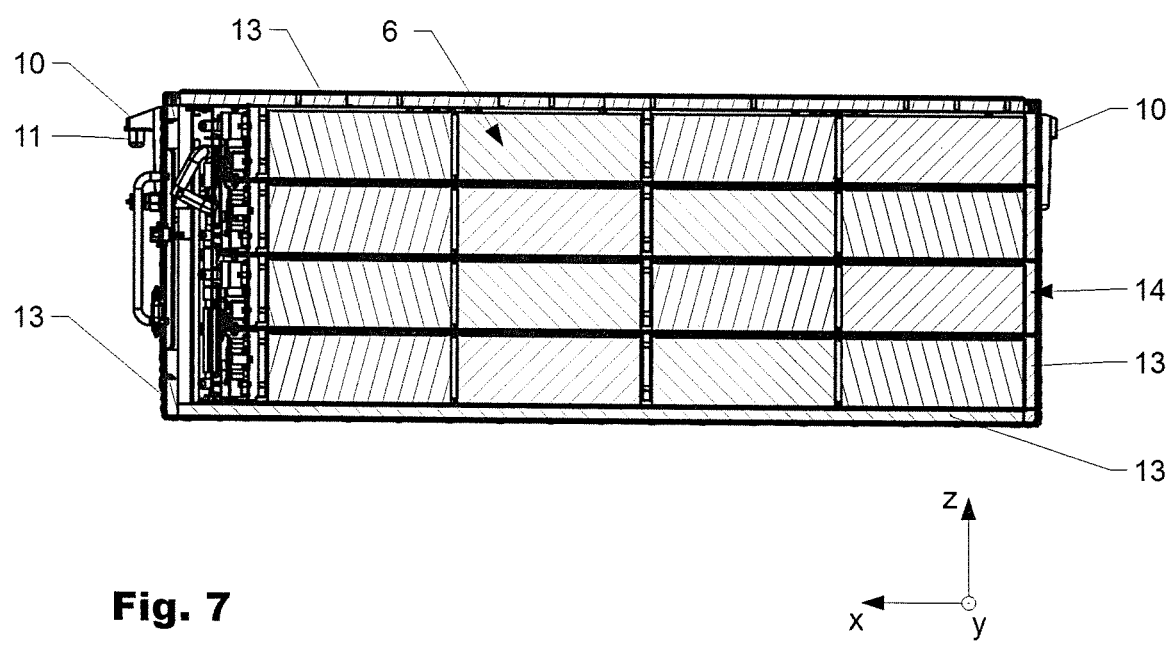
FIG. 7 shows a cross-sectional view of the battery pack of FIG. 6 indicated by section line C.

FIG. 6 shows a perspective view of the battery pack 4 having mounting means 10 arranged on the respective end regions of the outer housing 5 in the longitudinal direction x. FIG. 7 shows sectional view of the battery pack 4 of FIG. 6 showing at least one battery unit 6 arranged inside and supported by the outer housing. Further shown is the at least one centering pin 11.

FIGS. 2, 4, 7 and 9 show partially the battery pack assembly 2 of the electric truck comprising at least one damping element 13 being arranged between the chassis 9 and the battery unit 6 configured to absorb lifetime reducing frequencies. The lifetime reducing frequencies usually range from 5 Hz to 100 Hz. In the shown variation of the battery pack assembly 2, said battery pack assembly 2 comprises two or more damping elements 13. FIGS. 2, 4, and 9 show at least one damping element 13 being arranged between the first and/or second cantilever 7, 8 and the outer housing 5 of the battery pack 4. Specifically, the damping element 13 is arranged at least partially between contact areas of at least one of the mounting means 10. Thereby the at least one damping element 10 forms an intermediate bearing layer between the battery pack 4 and the first and/or second cantilever 7, 8. FIG. 7 shows that in addition at least one damping element 13 is arranged inside the outer housing 5 of the battery pack 4. The damping element 13 inside the battery pack 4 acts as a support structure 14 for supporting the battery unit 6 with respect to the outer housing 5 of the battery pack 4. In the shown variation the support structure 14 substantially surrounds at the battery unit 6 making it possible to dampen vibrations of different deflection directions.

Rather, the words used in the specification are words of description rather than limitation, and it is understood that various changes may be made without departing from the scope of the disclosure.

LIST OF DESIGNATIONS

1 Electric truck
2 Battery pack assembly
3 Battery pack mounting structure
4 Battery pack
5 Outer housing of the battery pack
6 Battery unit
7 First cantilever
8 Second cantilever
9 Chassis
10 Mounting means
11 Centering pin
12 Seat
13 Damping element
14 Support structure
15 Guide surface
16 Alignment device
17 Securing means
X Longitudinal direction
Y Transversal direction
Z Vertical direction
L Length in longitudinal direction
W Width in transversal direction
H Height in vertical direction

What is claimed:

1. An electric truck (1) comprising:
a battery pack assembly (2) including a battery pack mounting structure (3) and at least one battery pack (4), wherein the battery pack (4) includes a box shaped outer housing (5) having a certain length (L) in a longitudinal direction (x) of the truck (1), a certain width (W) in a transversal direction (y) of the truck (1) and a certain height (H) in a vertical direction (z) of the truck (1) and a battery unit (6) arranged inside and supported by the outer housing (5);
the battery pack mounting structure (3) per battery pack (4) including a first and a second cantilever (7, 8) attached to a chassis (9) of the electric truck (1), the first and second cantilever (7, 8) extending in transversal direction (y) and being in the longitudinal direction (x) spaced a distance apart from each other; and wherein the battery pack (4) during operation is interconnected to the first and the second cantilever (7, 8) in a floating manner allowing a torsional movement of the chassis (9) around the longitudinal direction (x).

2. The electric truck (1) according to claim 1, wherein the outer housing (5) is in the mounted position interconnected to the first cantilever (7) and to the second cantilever (8) by mounting means (10).

3. The electric truck (1) according to claim 2, wherein the mounting means (10) in combination provide at least in vertical direction (z) a three-point suspension for the outer housing (5) with respect to the first and the second cantilever (7, 8).

4. The electric truck (1) according to claim 2, wherein the mounting means (10) are out of the group of following elements or a combination thereof: Groove and pin; centering pin and centering hole; types of bolt connectors; or slide connectors.

5. The electric truck (1) according to claim 1, wherein the battery pack (4) in the mounted position is arranged between the first and the second cantilever (7, 8).

6. The electric truck (1) according to claim 2, wherein the at least one mounting means (10) is formed by a centering pin (11) and a seat (12), into which the centering pin (11) engages in the mounted position.

7. The electric truck (1) according to claim 1, wherein at least one damping element (13) is arranged between the chassis (9) and the battery unit (6) configured to absorb lifetime reducing frequencies.

8. The electric truck (1) according to claim 7, wherein the at least one damping element (13) comprises at least partially of a porous material and/or an elastic polymer.

9. The electric truck (1) according to claim 1, wherein at least one damping element (13) acts as a support structure (14) for supporting the at least one battery unit (6) with respect to the outer housing (5) of the battery pack (4).

10. The electric truck (1) according to claim 9, wherein the support structure (14) substantially surrounds at the least one battery unit (6).

11. The electric truck (1) according to claim 1, wherein at least one damping element (13) is arranged between the first and/or second cantilever (7, 8) and the outer housing (5) of the battery pack (4).

12. The electric truck (1) according to claim 1, wherein at least the first and/or the second cantilever (7, 8) comprises at least one guide surface (15) extending in traversal direction (y) configured to guide the battery pack (4) when moved in the traversal direction (y) during insertion into the mounted position.

13. The electric truck (1) according to claim 1, wherein the battery pack mounting structure (3) comprises an alignment device (16) configured to limit a movement of the battery pack (4) in the transversal direction (y) when moved towards the mounted position and to align the mounting means (10).

* * * * *